US010337107B2

(12) United States Patent
Spurgeon

(10) Patent No.: US 10,337,107 B2
(45) Date of Patent: Jul. 2, 2019

(54) SOLAR HYDROGEN PRODUCTION FROM AMBIENT WATER VAPOR ELECTROLYSIS

(71) Applicant: University of Louisville Research Foundation, Inc., Louisville, KY (US)

(72) Inventor: Joshua Spurgeon, Louisville, KY (US)

(73) Assignee: UNIVERSITY OF LOUISVILLE RESEARCH FOUNDATION, INC., Louisville, KY (US)

( * ) Notice: Subject to any disclaimer, the term of this patent is extended or adjusted under 35 U.S.C. 154(b) by 49 days.

(21) Appl. No.: 15/584,649

(22) Filed: May 2, 2017

(65) Prior Publication Data
US 2017/0321329 A1  Nov. 9, 2017

Related U.S. Application Data

(60) Provisional application No. 62/331,101, filed on May 3, 2016.

(51) Int. Cl.
| | |
|---|---|
| C25B 1/02 | (2006.01) |
| C25B 15/02 | (2006.01) |
| C25B 3/00 | (2006.01) |
| C25B 1/04 | (2006.01) |

(52) U.S. Cl.
CPC ............... *C25B 1/02* (2013.01); *C25B 1/04* (2013.01); *C25B 3/00* (2013.01); *C25B 15/02* (2013.01);
(Continued)

(58) Field of Classification Search
CPC .. C25B 1/02; C25B 3/00; C25B 15/02; C25B 1/04; Y02P 20/134; Y02P 60/366; Y02P 70/10
See application file for complete search history.

(56) References Cited

U.S. PATENT DOCUMENTS

| | | | | |
|---|---|---|---|---|
| 4,352,722 A | * | 10/1982 | Ohkawa | C25B 1/003 136/251 |
| 6,981,367 B2 | * | 1/2006 | Childs | C25B 1/12 123/1 A |

(Continued)

OTHER PUBLICATIONS

Kumari et all., Solar Hydrogen Production from Seawater Vapor Electrolysis, Energy Environ. Sci., 9, (Mar. 2016), 1725-1733.*
(Continued)

*Primary Examiner* — Arun S Phasge
(74) *Attorney, Agent, or Firm* — Wyatt, Tarrant & Combs, LLP; Stephen C. Hall; Max E. Bridges

(57) ABSTRACT

Hydrogen gas as a power source is obtained from gaseous water, including seawater vapor existing abundantly at near-surface levels of the oceans or humid air over land. An integrated system of photovoltaic cells for capturing and harnessing solar energy is combined with a water vapor electrolysis system comprising an electrolyzer with an anode compartment and a cathode compartment separated by a proton exchange membrane. The photovoltaic aspects of the system convert the energy of the sun to drive electrolysis of gaseous water from the environment. The electrolyzer aspects include an anode, a cathode, and a proton exchange membrane. At the anode, oxygen evolution reaction (OER) catalysts oxidize $H_2O$ to oxygen gas and protons, the latter being diffused through a membrane (e.g., a solid polymer electrolyte membrane such as Nafion). At the cathode, photogenerated electrons are conducted to hydrogen evolution reaction (HER) catalysts to reduce the protons to hydrogen gas, while concentration gradients drive the generated $O_2$ back to the atmosphere.

15 Claims, 11 Drawing Sheets

(52) U.S. Cl.
CPC ............ *Y02E 60/366* (2013.01); *Y02E 70/10* (2013.01); *Y02P 20/134* (2015.11)

(56) References Cited

U.S. PATENT DOCUMENTS

| | | | | |
|---|---|---|---|---|
| 2003/0116443 | A1* | 6/2003 | Maruyama | B82Y 30/00 205/637 |
| 2013/0092549 | A1* | 4/2013 | Spurgeon | H01L 31/0586 205/340 |
| 2013/0256147 | A1 | 10/2013 | Lewis et al. | |
| 2014/0021034 | A1 | 1/2014 | Lewis et al. | |

OTHER PUBLICATIONS

S. Kumari, et al.; Solar Hydrogen Production from Seawater Vapor Electrolysis; Journal article; Energy and Environmental Science; 2013,00; pp. 1-9.

S. Marini, et al.; Advanced alkaline water electrolysis; Electrochimica Acta; 2012; pp. 384-391; 82; journal home page: www.elsevier.com/locate/electacta.

A. Ursua, et al.; Hydrogen Production From Water Electrolysis: Current Status and Future Trends; Proceedings of the IEEE; Feb. 2012, vol. 100; pp. 410-426.

M. Carmo, et al.; A comprehensive review on PEM water electrolysis; Journal; International Journal of Hydrogen Energy; 2013; 38; pp. 4901-4934; journal homepage: www.elsevier.com/locate/he; SciVerse ScienceDirect; www.sciencedirect.com.

J.M. Spurgeon, et al.; Proton exchange membrane electrolysis sustained by water vapor; Paper; Energy & Environmental Science; 2011; 4; pp. 2993-2998.

S. Sawada, et al.; Solid polymer electrolyte water electrolysis systems for hydrogen production based on our newly developed membranes, Part I: Analysis of voltage-current characteristics; Journal; Progress in Nuclear Energy; 2008; 50; pp. 443-448; www.sciencedirect.com.

C. Xiang, et al.; Modeling an integrated photoelectrolysis system sustained by water vapor; Paper; Energy & Environmental Science; 2013; 6; pp. 3713-3721; RSC Publishing.

M.A. Modestino, et al.; Vapor-fed microfluidic hydrogen generator; article; Lab on a Chip; Apr. 2015; 15; pp. 1-8.

S. Ma, et al.; Journal of the Electrochemical Society; manuscript; 2006; 153; 12; pp. A2274-A2281.

\* cited by examiner

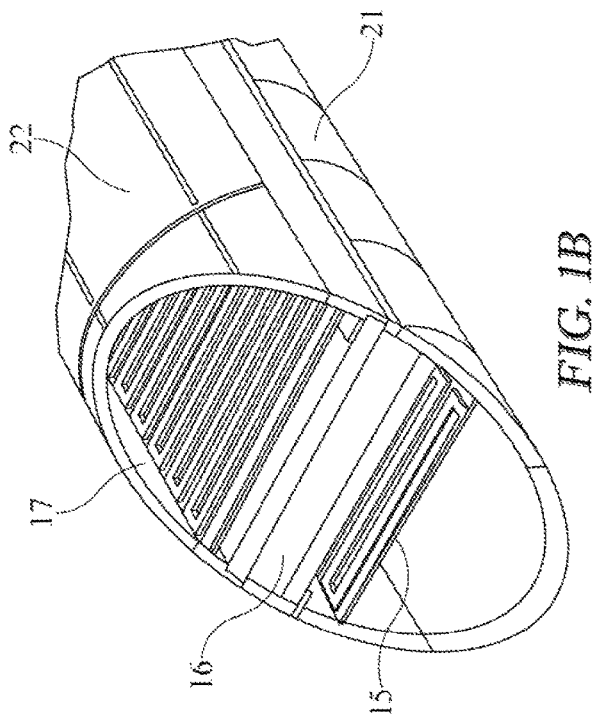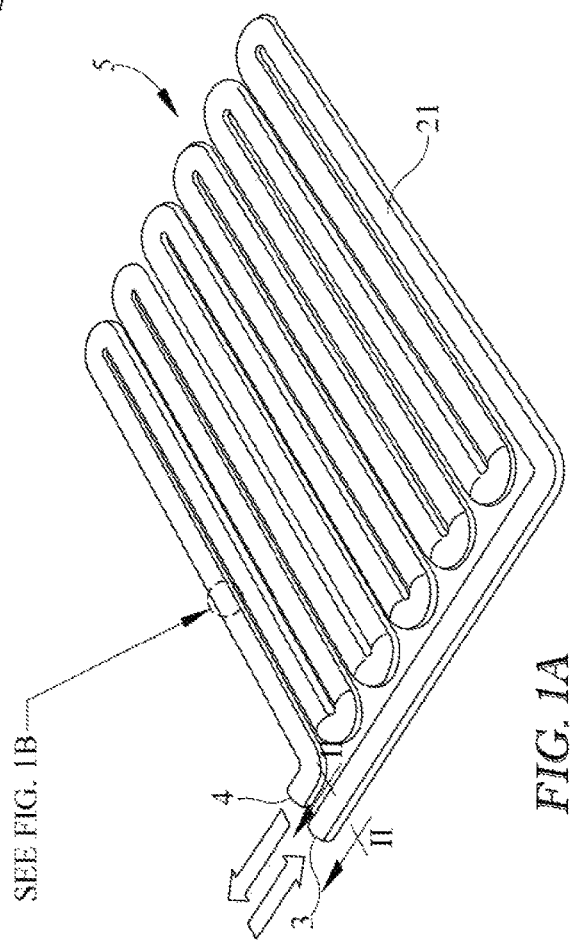

SOLAR HYDROGEN PRODUCTION FROM AMBIENT WATER VAPOR ELECTROLYSIS

CROSS REFERENCE TO RELATED U.S. APPLICATION

This application claims the benefit of priority to U.S. Provisional Application No. 62/331,101, which was filed on May 3, 2016, the contents of which are incorporated herein by reference.

STATEMENT OF GOVERNMENT INTEREST AND RIGHTS IN THE INVENTION

None.

FIELD OF INVENTION

Embodiments described herein relate to direct, solar-driven hydrogen production through electrolysis as a source of fuel from natural sources, including marine applications that involve the harvesting of oceans for their abundant near-surface seawater vapor and land-based uses, the former converting humidified seawater to hydrogen and the latter converting the ambient humidity in the atmosphere over land to hydrogen using similar approaches.

BACKGROUND

The conversion of solar energy into clean fuels such as hydrogen is a promising energy source with the potential to turn solar into a portable, energy-dense form for transportation applications as well as a reliable, practical primary energy source for utility-scale generation. Disadvantageously, the limitation of the solar flux at the earth's surface necessitates large land areas for a solar photovoltaic utility to provide power on par with a traditional power plant. The difficulty of acquiring so much contiguous land area, the cost of the purchase, and the potential consequences to wild habitat are all concerns for large-scale solar utilities. These and other factors make solar photovoltaic harvesting of energy from the sun challenging to accomplish at a large scale. Efforts have been marked by a need for large land areas to produce power equivalent to a conventional fossil fuel utility. Furthermore, the intermittency of sunlight prohibits reliable baseload power generation and necessitates the use of energy storage to provide consistent electricity production. These challenges have been an impediment to solar energy becoming a reliable, continuous energy source as an alternative to fossil fuels.

Electrolysis of liquid water to obtain hydrogen gas as a fuel source is another approach that has been tried. Existing electrolysis technologies include alkaline water electrolyzers and proton exchange membrane (PEM) electrolyzers. Both approaches rely on liquid water electrolyte to achieve sufficiently high current densities (about 1 ampere/$cm^2$, which is shown elsewhere as A/$cm^2$) at commercial application levels, which would require large quantities of freshwater for a utility-scale solar fuel production system. Tailoring proton exchange membrane electrolyzers for use with ambient humidity, including seawater vapor, and improving the performance and efficiency of these systems are the subject of present embodiments.

Besides the large quantities of freshwater that would be needed, water that is input to these electrolyzers might be further purified to deionized (DI) water to prevent the impurities from depositing on the catalysts and increasing the overpotential of the water-splitting reaction (i.e, electrolysis). However, to do so with freshwater, at the type of scale that would be desirable, raises its own difficulties in terms of limited resources in a water-scarce environment. Further, there is the challenge of having to pump liquid water that results in an energy loss in these systems. Potentially, the abundant water resources of the ocean could serve as the feedstock for hydrogen generation, but electrolysis in seawater is hampered by the salts and impurities of the oceans. The impurities in the seawater, which cause fouling of the catalyst marked by electrochemical reduction of impurity metals onto the cathode of the electrode array, tend to decrease the current density that might otherwise be achievable and leading to irreversible degradation of the voltage-current density association.

Accordingly, there is a defined and tangible benefit associated with achieving efficient and stable solar hydrogen production through electrolysis, as a replacement to hydrogen generation from fossil fuels, and which can be accomplished in ways other than through the use of liquid freshwater as a feedstock. Success in this regard would be characterized by avoiding the steps and costs associated with active water purification and the reliance upon deionized water to mitigate impurities.

SUMMARY OF EMBODIMENTS

Present embodiments provide a novel integration of photovoltaic (PV) cells combined with vapor electrolysis systems. The embodiments provide for the harvesting of the oceans for their abundant near-surface seawater vapor, or in similar fashion the ambient humidity over land, which in either case is converted to energy-dense, clean hydrogen fuel. The conversion efficiency for solar-driven hydrogen production by the present embodiments is advantageous compared to using liquid seawater feedstock. This is because liquid seawater experiences a substantial drop in efficiency over time due to impurities in the water. Conversely, such impurities are substantially absent from seawater vapor formed by evaporation near the surface of the ocean, in that the salts and various impurities do not vaporize and are left in the seawater. The inventive approach of solar-driven electrolysis of seawater vapor bypasses the catalyst fouling issues associated with liquid seawater. Vapor-fed electrolysis enables photovoltaic-driven hydrogen ($H_2$) production from ambient humidity at efficiencies comparable to that achievable with liquid electrolyte. Accordingly, present embodiments provide for stable, direct solar $H_2$ production at near-surface ocean operating conditions.

An apparatus, system, and method of the present embodiments achieving solar hydrogen production from seawater vapor electrolysis uses the atmospheric water vapor over the sea as a feedstock for the production of hydrogen. The vapor is largely free of salt and impurities, and near-surface vapor of sufficient relative humidity is very abundant year-round for commercially feasible fuel production. While specific humidity varies somewhat with latitude, the global relative humidity over the oceans is fairly steady between about 75-85%, with some minor variation seasonally.

Present embodiments employ a proton exchange membrane electrolyzer integrated with a photovoltaic array producing sufficient voltage to split water vapor into $H_2$ and $O_2$. In some embodiments, a proton exchange membrane electrolyzer comprises an anode and cathode separated by the membrane portion of a membrane-electrode assembly, with seawater-humidified air (about 79% $N_2$ and 21% $O_2$) flowing to the anode and a carrier gas such as nitrogen flowing to the cathode. In some embodiments, the anode and cathode are formed as two stainless steel grids, among other alternatives for their manufacture, e.g., the use of semi-conductive materials. A carbon-supported platinum catalyst (Pt/C) is a suitable proton exchange catalyst, with the catalyst as selected by a user being dispersed on the electrodes through conventional techniques. The configuration results in a reduced load on the electrolyzer since the photoactive component determines the footprint, and overall the demands on the electrolyzer catalysts are reduced, potentially enabling the use of less active, but cheaper and more abundant catalysts. A proton exchange membrane electrolyzer according to present embodiments further comprises gas inlet and gas outlet ports, for each of the anode and cathode. In an exemplary (non-limiting) system, an inlet port receives humidified air containing water in the gaseous state from the atmosphere and a carrier gas (e.g., nitrogen or other inert gas having substantially no oxygen content) which provides access to the anode, while carrier gas and hydrogen gas (a product of the reactions taking place inside the electrolyzer) exit the cathode through an outlet port. The hydrogen gas product is separated from the carrier gas and stored. The carrier gas can be recycled for further use in moving humidified air through the inlet and into the anode chamber.

As stated above, in some embodiments the apparatuses of the present embodiments can be set up over seawater away from the coast, obviating the need for large tracts of land and precious water resources. An advantage of seawater is its abundant supply that exists over the earth, but the present embodiments are not limited to use over water. Thus, the apparatuses need not be buoyant upon water and can be set up to operate on land to produce hydrogen from ambient humidity in the air over the land, in much the same fashion as described herein for operation over water.

By way of further non-limiting example, according to present embodiments the solar power and ambient humidity over land can be used to supply energy needs for cell towers in remote locations that need reliable, off-grid energy production. Presently, tens of thousands of such cell towers are placed annually in developing areas of the world. Energy supplied from hydrogen gas produced by the electrolysis of water in ambient humidity could replace diesel-powered generators, which presently are a common method of powering cell towers in such locations.

In some embodiments, the photovoltaic array is a triple junction amorphous Si (tj-a-Si) cell (sometimes referred to as "triple-junction cell" or "triple junction photovoltaic cell") that is directly connected to the membrane-electrode assembly, the area of which may match that of the electrodes. Any photovoltaic arrangement to provide the necessary voltage for electrolysis would work in the apparatus.

In some embodiments, the electrolysis reaction is aided by both hydrogen evolution and oxygen evolution reaction catalysts. Thus integrated, the proton exchange membrane electrolyzer produces hydrogen fuel from solar energy by electrolysis of seawater vapor at near-surface ocean conditions, offering abundantly vast areas where the relative humidity at sea is sufficiently high year round. The electrolysis of water vapor occurs indirectly, with no active water purification involved. Conversely, when liquid seawater is used for feedstock, a typical proton exchange membrane electrolyzer is prone to fouling, and otherwise not stable. Consequently, the current density and resulting efficiency wane after a period of use (e.g., 50 hours under laboratory conditions as further described herein). By comparison, potentiostat monitoring of current associated with the inventive proton exchange membrane electrolyzer, at an applied bias of about 1.6 V and higher, show that current density remains relatively constant at ambient near-surface ocean humidity conditions involved with the electrolysis of seawater vapor. Experiments related to present embodiments generally showed that with seawater vapor (i.e., seawater-humidified air) as the feedstock, the current density for the electrolysis remained steady for more than 50 hours, indicating lack of significant impurities in the vapor stream that might otherwise foul the catalyst.

Additionally, a number of other benefits are associated with the present embodiments. In producing a clean fuel (hydrogen), the system is environmentally benign, with no carbon emissions. By integrating photovoltaics with electrolysis, the system reliably harnesses solar energy to produce hydrogen, which is more cost-effective compared to having separate photovoltaic and electrolyzer units. Further, integrating the electrolyzer within the footprint determined by the solar photoactive area limits electrical stress on the catalytic components. In addition, the use of ambient humidity avoids the need for water purification systems.

BRIEF DESCRIPTION OF THE FIGURES

The drawings, schematics, figures, and descriptions herein are to be understood as illustrative of structures, features and aspects of the present embodiments and do not limit the scope of the embodiments. Where the figures provide or suggest dimensional information, the scope of the application is not limited to the precise arrangements, scales, or dimensions as shown in the drawings, nor as discussed in the textual descriptions.

FIG. 1A shows a system providing a photoactive area and electrolysis for hydrogen generation from water vapor, according to multiple embodiments and alternatives.

FIG. 1B is a cross-sectional view of the region in FIG. 1A denoted by dashed lines, according to multiple embodiments and alternatives.

MULTIPLE EMBODIMENTS AND ALTERNATIVES

Disclosed herein are photovoltaic-driven hydrogen production system for use at or near an ocean surface to obtain hydrogen gas from seawater vapor. Present embodiments have significant advantages over a land-based solar fuels production system, in that they offer a fully integrated system floating at the ocean surface like a system of buoys to capture near-surface seawater vapor that is converted to hydrogen fuels ($H_2$).

In some embodiments, a buoyant casing supports two or more photovoltaic cells whose panels form an array that is positioned upon or slightly above the ocean surface (i.e., near-surface). The photovoltaic cell receives solar energy that is converted to electric potential energy (voltage) sufficient to split seawater vapor into oxygen gas and hydrogen ions (i.e., protons) in a catalyzed electrolysis reaction. Each photovoltaic cell further comprises an anode compartment that houses an anode and receives humidified seawater having undergone evaporation into seawater vapor, wherein the seawater is converted through electrolysis to oxygen gas and hydrogen (i.e., protons) at the anode. A cathode compartment houses a cathode, and receives the protons which are catalytically reduced to hydrogen gas at the cathode. When the hydrogen gas is produced in this fashion, it can be transported to a storage vessel (not shown) as part of a ship or stationary platform based solar hydrogen utility. In some embodiments, a carrier gas is used for transporting hydrogen gas out of the cathode compartment via a cathode outlet 4 (FIG. 1A), with the arrow proximal to outlet 4 indicating flow out of the system. The hydrogen gas can be separated at that point and transported to a storage compartment. In some embodiments, a separation platform is configured to separate hydrogen gas from the carrier gas through methods which are known to those having ordinary skill in the art, e.g., pressure swing adsorption. With the production and storage of hydrogen gas in this manner, the point of storage and the point of usage can be completely decoupled. The system is capable of being configured for use either on a floating buoyant support or on board a ship floating upon the surface of the open ocean. Alternatively, the present embodiments can be used over a land mass for capturing ambient moisture in the air, particularly in very humid climates.

Figure 2:
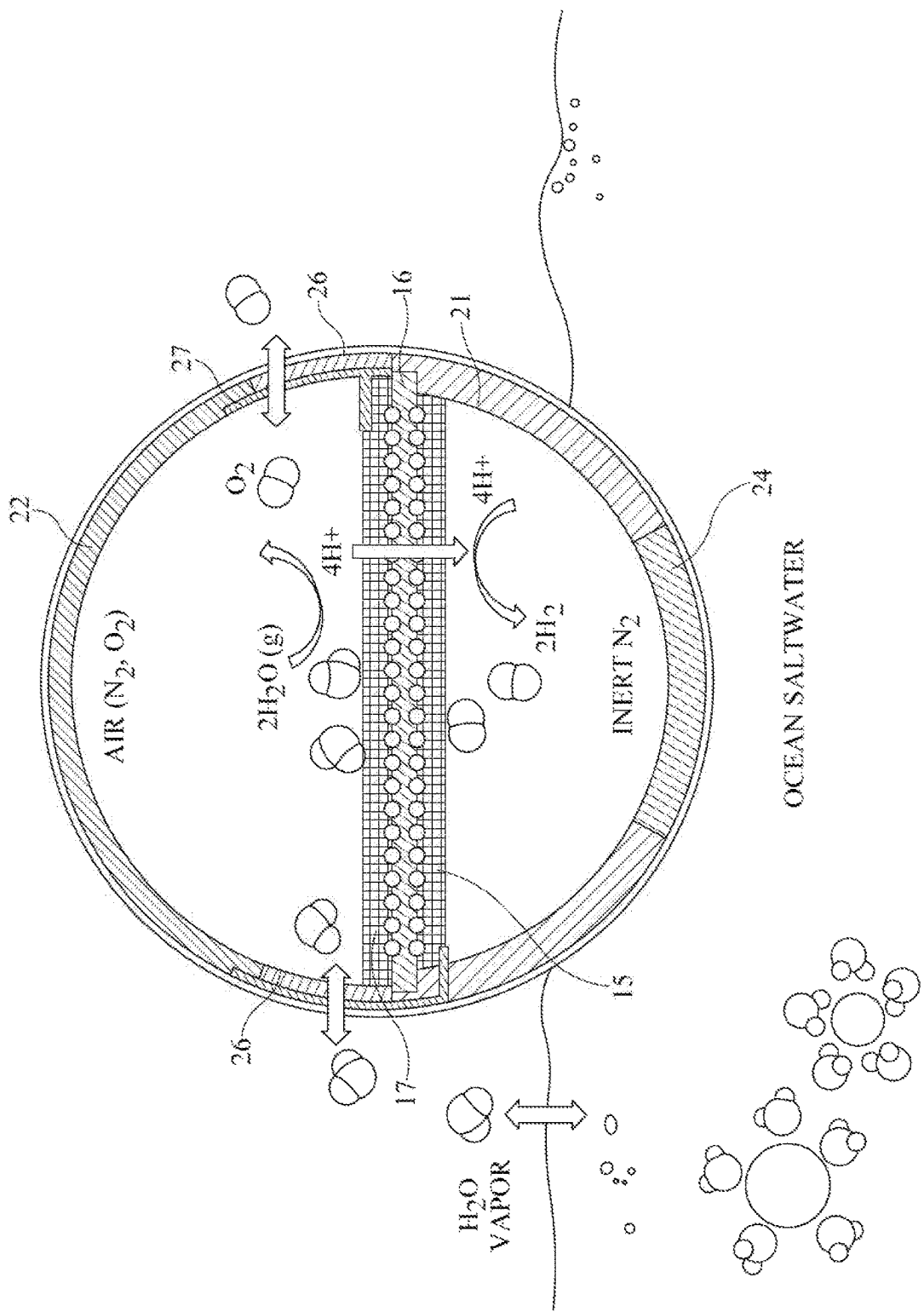
FIG. 2 is a cross-sectional view taken along line II-II of FIG. 1A, showing a marine solar fuel buoy that incorporates a membrane-electrode assembly, and further comprises ballast for orienting the photovoltaics, according to multiple embodiments and alternatives.

In some embodiments, particularly when used in a marine environment as opposed to a land-based use, the system further comprises ballast for stabilizing the casing and positioning the cell above the ocean surface where it can receive solar energy. A suitable ballast is water, which can be contained in a separate compartment of the casing. In some embodiments, both marine and land-based, a semi-permeable breathable membrane 26 as illustrated in FIG. 2 covers inlet 3 and blocks liquid water or contaminants in the atmosphere from entering the anode compartment. This membrane is permeable to seawater vapor and humidified air, which enter the system via inlet 3 with the arrow proximal to inlet 3 in FIG. 1A indicating air flow into the system. As water vapor enters the anode compartment, which can occur by diffusion through the membrane under a concentration gradient, it undergoes electrolysis. As desired, oxygen evolution reaction catalysts as known in the art help facilitate this reaction.

With respect to entry of seawater vapor or humidified air, the membrane arranged with inlet 3 is a breathable membrane such as GORE-TEX® that is substantially impermeable to liquid seawater, i.e., that blocks liquid water but allows the passage of water vapor. In this way, it substantially restricts the passage of liquid seawater while permitting passage of seawater vapor, thus allowing seawater vapor into the anode chamber while substantially preventing the entry of liquid seawater which could foul the catalysts inside the anode and cathode compartments. Additionally, the systems according to the present embodiments contain a membrane-electrode assembly positioned between the anode compartment and the cathode compartment through which protons pass as water molecules undergo electrolysis.

Figure 3:
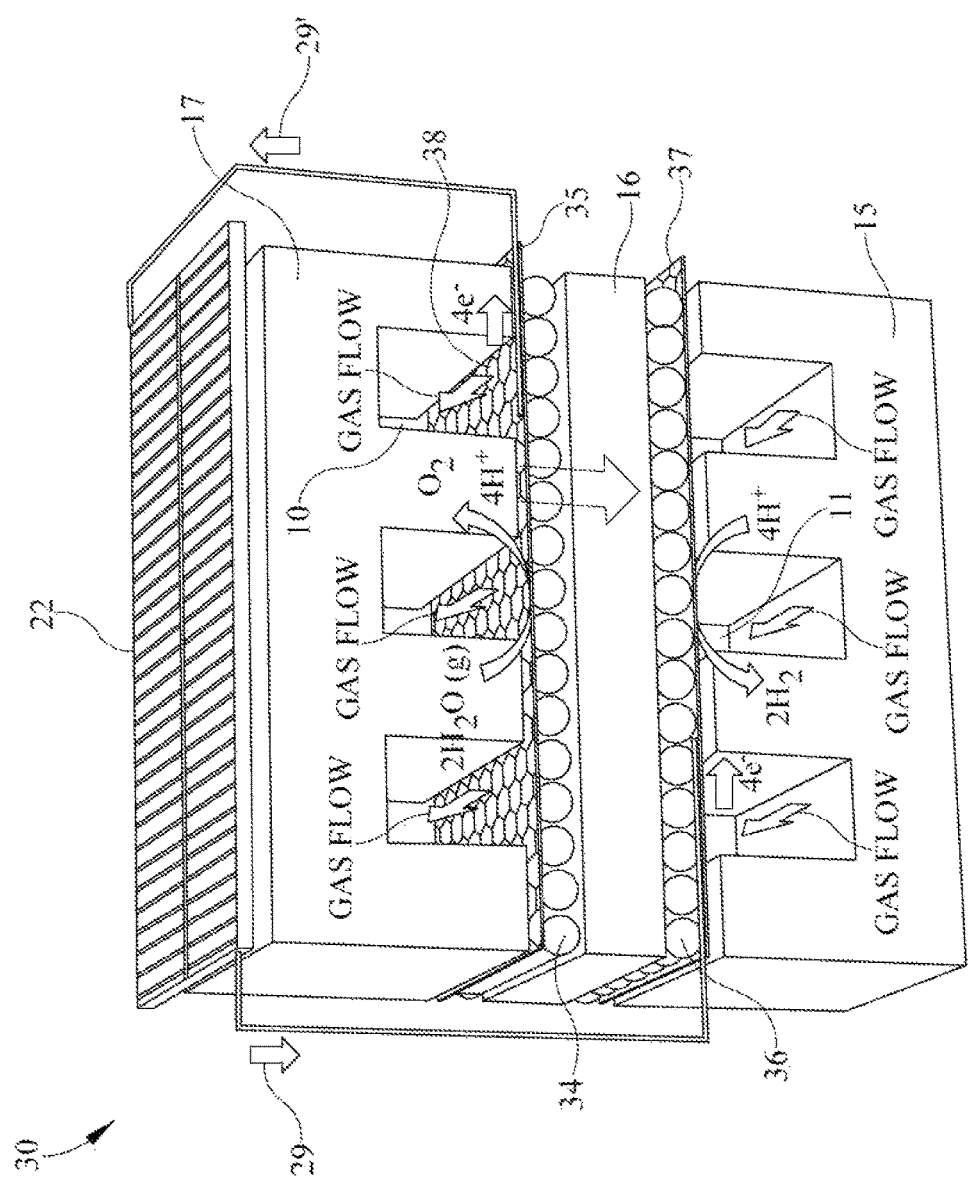
FIG. 3 is a schematic of a proton exchange membrane electrolyzer, according to multiple embodiments and alternatives.

According to present embodiments, FIG. 1A illustrates a casing 5, to which ballast could be added for proper orientation in a marine environment. As seen in FIG. 1B and FIG. 3, the anode compartment 17 and cathode compartment 15 provide different pathways separated by proton exchange membrane 16 and otherwise providing an anode flow channel 10 and a cathode flow channel 11. In FIG. 3, the flow of gas through channels 10, 11 may include one or more carrier gases and is indicated by a directional arrow, and there are presented here, in non-limiting fashion, an embodiment having three flow channels 10 in anode compartment 17 and three flow channels 11 in cathode compartment 15. (For brevity, only one of the three flow channels is marked in the drawing with a reference numeral, i.e., 10 or 11.) The number of flow channels is not limiting.

In some embodiments, water vapor and carrier gas travel into and through anode flow channel 10. Carrier gases flowing through the anode compartment and cathode compartment can be provided through means known in the art such as by a battery-powered pump or a blower (not shown). FIG. 2 represents the electrolysis reaction occurring in anode chamber 17, which results in hydrogen ions (i.e., protons) produced by that reaction crossing membrane 16 into the cathode chamber 15. The electrons produced by this reaction move freely within the metal grids forming both the anode and cathode. In the cathode compartment, the formation of hydrogen gas ($H_2$) which travels through cathode flow channel 11 to outlet 4. Either at or downstream of outlet 4 in a production flow, the carrier gas (e.g., nitrogen) and hydrogen gas are separated through techniques which are known in the art, and the hydrogen is stored in a vessel for future use or transport.

If desired, some of the hydrogen produced in this system can be diverted to serve as fuel for powering any pumps, blowers, or ancillary devices used in the system, e.g., for maintaining the flow of carrier gas. Optionally, the flow channels are arranged in serpentine manner to increase the mass transfer of the gases and the uniformity of the gas flux to each area of catalyst. FIG. 1B (a region of FIG. 1A denoted by dashed lines) shows a cross-section of the anode chamber 17 and the cathode chamber 15 arranged to provide these flow channels and being separated by proton exchange membrane 16.

FIG. 2 provides a cross-section of a marine solar fuel buoy casing 5 that is supported by a buoyant casing 21 as part of a hydrogen generation system according to multiple embodiments described herein. Although a marine application of the embodiments is illustrated in this figure, the same core components could be equipped to obtain hydrogen fuel from the ambient humidity over land. In the FIG. 2 illustration of an ocean setting, proton exchange membrane 16 is arranged with a ballast-containing reservoir 24 for orienting the photovoltaic cell 22 at or above the ocean surface. The aforementioned semi-permeable breathable membrane that covers the inlet to the anode chamber is also referred to as inlet membrane 26, and this allows seawater vapor to pass into the anode chamber while substantially restricting liquid seawater from passing into the anode chamber. For land-based uses, while an inlet membrane 26 is optional, generally the approach is similar in terms of combining photovoltaics with an electrolyzer, wherein water in the gaseous state flows under a carrier gas into an anode compartment, where energy harnessed from the sun is used to split water molecules, and the resulting hydrogen ions migrate to a cathode chamber. In some embodiments, inert $N_2$ flows to the cathode to increase faradaic efficiency for the conversion to $H_2$. In some respects, the rate of movement of air into the anode will be proportional to the current density, with a 30 sccm flow rate providing suitable water vapor electrolysis without suffering from mass transport limitations. But at a certain point, a lower gas flow rate is a consideration for placing acceptable load on the proton exchange membrane electrolyzer to match its operation and load with the photovoltaic performance. Additionally, a low cathode gas flow rate is a consideration for obtaining higher concentrations of $H_2$ in the output stream.

FIG. 3 is a schematic of a proton exchange membrane electrolyzer 30 that includes a photovoltaic cell 22 as part of a marine solar fuel buoy casing 5 as shown in FIG. 2. This particular, non-limiting arrangement illustrates a solar-driven hydrogen production system using seawater vapor, wherein the area of the photovoltaic cell covers substantially the same area as the anode compartment 17 and the cathode compartment 15, separated by proton exchange membrane 16.

As one of many alternative configurations, the scope of present embodiments also includes apparatuses that use an anion exchange membrane instead of a proton exchange membrane. A similar setup would be used in terms of two chambers separated by a membrane, except with the first chamber at a relatively high pH (e.g., >9). In such an arrangement, ambient water vapor as found in humidified air enters the first chamber and undergoes electrolysis, in which catalysts as are known in the art may be used. In response to the concentration gradient at higher pH, hydroxide ions rather than protons transfer across an anion exchange membrane, into the second chamber, resulting in the separation of $H_2$ from water. In some embodiments, following its separation from hydroxide ions, $H_2$ is then transferred from the first chamber into a storage vessel, by carrier gas if desired and via outlet 4.

With regard to a proton exchange membrane electrolyzer according to present embodiments, the relative humidity (RH) of air flowing to the anode is also a consideration. The lower the relative humidity, the lower the concentration of water molecules. This reduced concentration can produce mass transport limitations which reduce the achievable limiting current density in the electrolyzer. Furthermore, the ionic conductivity of the membrane is dependent upon its hydration. Thus, lower relative humidity can have the additional effect of partial drying the membrane and reducing its conductivity, which adds resistance to the system. Thus, choices are expected in terms of locating the buoys in a particular region where humidity is substantially at or above sufficient levels for most of the time the system is in use.

The following examples further illustrate the present embodiments for various applications. These are merely illustrative, and not meant as limiting. Other embodiments, alternatives, and suitable applications will be evident from review of the teachings and examples provided herein.

EXAMPLES

General experimental conditions for the examples utilized proton exchange membrane reversible fuel cells (Horizon Fuel Cell Technologies, Singapore) in electrolyzer mode to split seawater vapor. In some embodiments, two stainless steel grids (35, 37) are positioned in the electrolyzer as shown in FIG. 3 (one stainless steel grid 35 on the anode compartment side and one stainless steel grid 37 on the cathode compartment side. In some embodiments, the grids are arranged with thin paper sheets (e.g., two carbon Toray paper sheets) providing one or more gas diffusion layers 38 through which hydrogen ions pass as represented in FIG. 2 and FIG. 3, while the electrons produced in electrolysis are conducted freely within the metal structure or semi-conductive structure. Accordingly, the membrane-electrode assembly can be used over large areas and is generally provided with catalyst particles on either side of a sulfonated polytetrafluoroethylene (i.e., Nafion, although present embodiments include alternative membranes that cost less to manufacture) proton-exchange membrane (FIG. 3). Alternative ionomer membranes could be employed as well, including but not limited to anion exchange membranes. Although it is not necessary to use the same catalyst, the particulate catalyst material (respectively shown as 34, 36 in FIG. 3) was the same for both electrodes (Pt/C). In some embodiments, catalysts are dispersed on opposite sides of proton exchange membrane 16 according to standard hot press methods. The scope of embodiments is not limited to specific catalysts. In some embodiments, the catalyst material is selected from noble metals (e.g., platinum, palladium, ruthenium, gold, to name a few), but less expensive catalysts can also be chosen. In certain respects, the approach of integrating the electrolyzer within the footprint determined by the solar photoactive area limits electrical stress on the catalytic components, and may make the use of less expensive catalysts more technically feasible.

Ultra-high purity $N_2$ (>99.99%) or dry air were used as carrier gases in all vapor-fed experiments. The carrier gas was saturated with seawater vapor by passing the gas through a series of two bubblers filled with either seawater (Carolina Biological Supply Company, Seawater 153783) or 18 Megaohm·cm resistivity deionized H2O. The seawater was Atlantic Ocean water of 18 ohm·cm resistivity containing less than 0.55 M $Na^+$ and $Cl^-$ and in smaller quantities, 10-50 mM, of $Mg^{2+}$, $Ca^{2+}$, $K^+$, and $SO_4^{2-}$). The rate at which the carrier gas was saturated with the seawater vapor ranged between about 10-50 sccm (with mass flow controllers from MKS instruments). The fully humidified gas stream was subsequently mixed with a dry gas stream, both at controlled flow rates, to create a gas flow of the desired relative humidity (sometimes referred to as "RH"). The system produced precise humidity levels (±2% RH) as monitored continuously by a relative humidity probe (Omega, RH-USB sensor). The fully saturated carrier gas stream before the addition of dry gas was measured to have relative humidity of approximately 100%. To reduce the back diffusion of ambient conditions into the electrolysis unit, the output stream from the proton exchange membrane electrolyzer was bubbled through a water bath. A lack of significant gas leakage in the system was confirmed by collecting the output gas stream in an inverted, liquid-filled graduated cylinder and comparing the collected volume to the time-integrated gas flow rate.

Most of the examples plot current density vs. voltage (J-V), under varying experimental conditions (e.g., flow rate against relative humidity). Before conducting measurements, the proton exchange membrane electrolyzer 30 was allowed to equilibrate under steady-state gas flow conditions at open circuit for at least 1 hour. Electrical measurements were taken of direct current flowing through the electrolyzer in the direction of arrows 29, 29'. The current is generated by free electrons produced in electrolysis, and is used in determining faradaic efficiency. The electrical measurements were performed with an SP-200 model Bio-Logic potentiostat, which was used to apply DC bias to the electrolyzer and to measure the current through pins in contact with the current collector metal grids 31 (FIG. 3) at the electrodes. For the measurements performed with liquid water feedstock as a comparative example, the J-V behavior was measured by sweeping the voltage at a scan rate of 1 mV/second. In the case of measurements with liquid feedstock, the proton exchange membrane electrolyzer was immersed in a large beaker, providing liquid to both the anode and cathode without active pumping of the fluid.

For measurements performed with water vapor feedstock, the current was measured after 10 minutes under potentiostatic conditions at each voltage, using an applied bias from 0.5 to 2.6 V in 50 mV increments. Each water-vapor-fed J-V measurement took at least 8 hours. The current density was determined using the full projected area of the active part of the membrane-electrode assembly (5 cm$^2$). In certain respects, some degree of variance might be attributable to relative humidity fluctuation and minor variances in the performance of different proton exchange membrane electrolyzer units.

Faradaic efficiency was determined by measuring the concentration of $H_2$ in the cathode output gas, and comparing this value to the total charge passed during the time period in which the cathode gas sample was produced. The results are contained in Table 1, below:

TABLE 1

Faradaic efficiency (%) for $H_2$(g) measured at the cathode under different feedstock conditions to the proton exchange membrane electrolyzer.

| Feedstock to Anode/Cathode | $H_2$ Faradaic Efficiency (%) |
|---|---|
| $N_2$, RH100, 20 sccm/$N_2$, RH100, 20 sccm | 93 |
| Air, RH100, 20 sccm/Air, RH100, 20 sccm | 0 |
| Air, RH80, 20 sccm/$N_2$, RH0, 10 sccm | 63 |

The zero measurement of faradaic efficiency for Table 1, row 2 is attributable to air being supplied to the cathode. The significant amount of oxygen in the air tends to favor oxygen reduction to water to a much greater extent than the production of hydrogen. The difference in Faradaic efficiency between the $N_2/N_2$ (93%) versus Air/$N_2$ (63%) is probably attributable to oxygen crossover or leakage from the air at the anode to the cathode, producing a redirection of current toward oxygen reduction as opposed to reduction of protons to $H_2$. These findings are consistent with a preference for inert carrier gases. Further, as an example of design choices that might come into play and are well within the capabilities of skilled artisans, one might select a membrane to separate the anode and cathode compartments that is more impermeable to oxygen, to reduce or eliminate issues with crossover or leakage.

During the electrochemical measurements, $H_2$ concentration in the cathode output stream was analyzed using a gas chromatograph (GC). The GC was an SRI 8601C equipped with a thermal conductivity detector (TCD). The electrolyzer output gas was continuously flowed through the GC port, with an automated valve collecting 1 mL samples for testing at the specified times. The carrier gas was $N_2$ at 40 psi. For each reported value, the electrolyzer was operated potentiostatically at 1.6 V (or at the operating potential in the case of the photovoltaic-driven measurement) for about 60 minutes, with 4 GC measurements at 15, 30, 45, and 60 minutes averaged to determine faradaic efficiency.

The photovoltage required for sunlight-driven water electrolysis was accomplished in this study by employing a commercial triple-junction amorphous Si (a-Si) photovoltaic cell from SolarFocus. A Xe arc lamp (Oriel 67005) with an AM 1.5 filter was the illumination source at an intensity of 100 mW/cm$^2$ as determined using a calibrated photodiode. In the case of the direct PV-driven seawater vapor electrolysis measurements, the photovoltaic cell was directly connected to the proton exchange membrane electrolyzer under illumination with the potentiostat connected in ammeter mode to monitor current only. The electrolyzer was blocked from illumination during the quarter hour measurements to prevent temperature-dependent drift in the electrochemical performance. To approximate diurnal daylight conditions during the direct PV-driven electrolysis, the system was illuminated for 8 continuous hours, followed by 16 hours without illumination, repeated over more than 11 days to generate the reported illuminated current density vs. time behavior. All experiments were performed at room temperature (i.e., 70° F.).

The conductivity of proton exchange membrane 16 (Table 2) was determined using an established two-probe AC measurement technique, such as described in S. Ma, Z. Siroma and H. Tanaka, J. Electrochem. Soc., 2006, 153, A2274-A2281, and using frequencies between 5 MHz and 0.01 Hz with an oscillation of 10 mV. Bio-Logic Zfit software was used to determine the membrane resistance by fitting an equivalent circuit for proton exchange membrane electrolyzer fuel cells. The conductivity was subsequently calculated by dividing the membrane thickness (120 μm) by the tested membrane area (5 cm2) and the measured membrane resistance. Accordingly, ionic conductivity of the membrane-electrode assembly was measured under these operating conditions at three times: the initial start, after 8 hours of operation, and after a subsequent 12 hour period without applied bias, as reported in Table 2. Generally, the conductivity typically decreased after 8 hours of operation, before recovering fully after 12 hours without applied bias.

TABLE 2

Proton exchange membrane conductivity measurements (based on average of three measurements).

| Feedstock to Anode/ Feedstock to Cathode | Condition | Conductivity (mS cm$^{-1}$) |
|---|---|---|
| $N_2$, RH100, 20 sccm/ $N_2$, RH100, 20 sccm | Initial | 10.0 |
| Air, RH80, 20 sccm/ $N_2$, RH0, 10 sccm | Initial | 4.7 |
| Air, RH80, 20 sccm/ $N_2$, RH0, 10 sccm | After 8 h at 1.6 V | 3.6 |

TABLE 2-continued

Proton exchange membrane conductivity measurements (based on average of three measurements).

| Feedstock to Anode/ Feedstock to Cathode | Condition | Conductivity (mS cm$^{-1}$) |
|---|---|---|
| Air, RH80, 20 sccm/ $N_2$, RH0, 10 sccm | 8 h at 1.6 V, 12 h off | 4.9 |

Figure 4:
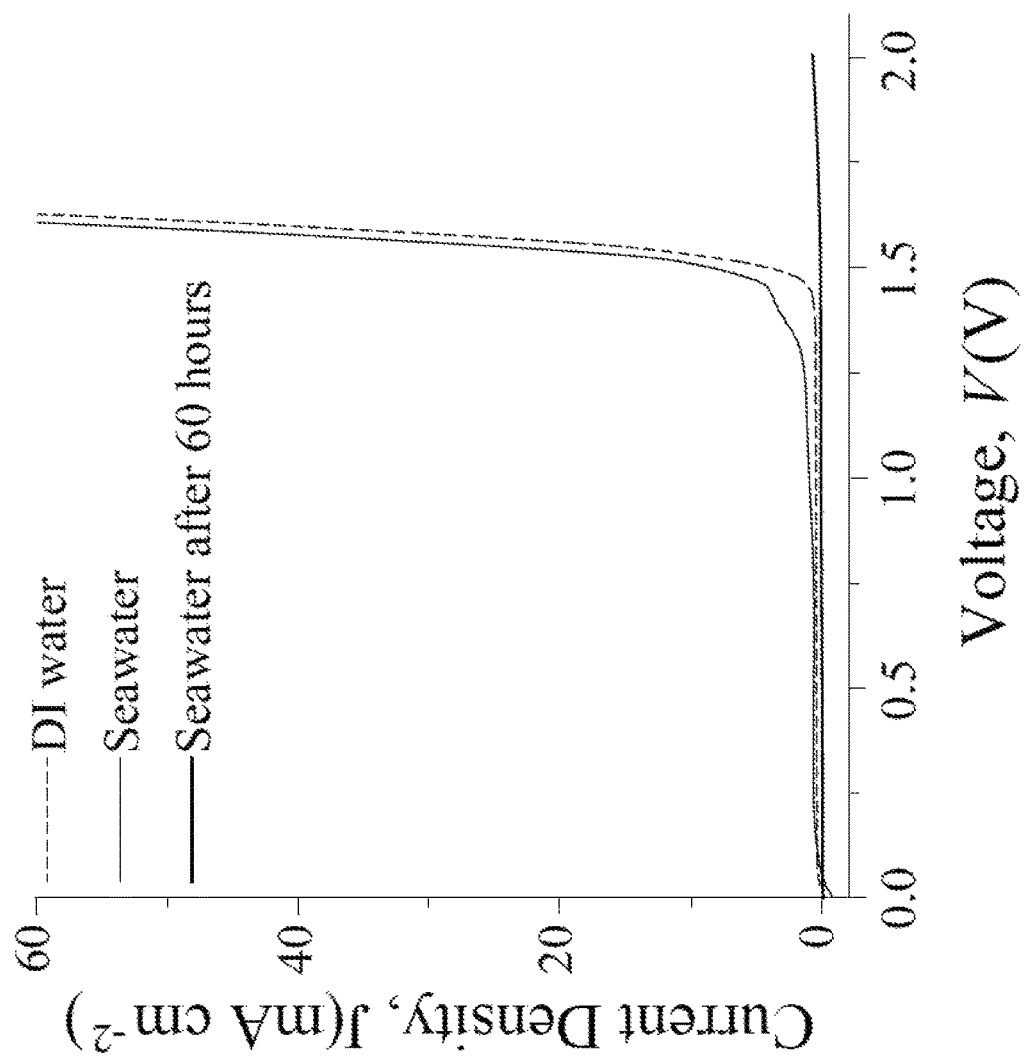
FIG. 4 plots current density, J, vs. applied voltage, V, of a proton exchange membrane electrolyzer with feedstocks that included liquid DI water, liquid seawater at initial conditions, and liquid seawater after 60 hours at 1.6 V applied bias.

Example 1/FIG. 4

DI Liquid Water and Liquid Seawater Feedstocks

FIG. 4 is a plot of current density (J) vs. applied voltage (V) for a proton exchange membrane electrolyzer handling feedstocks of liquid DI water, liquid seawater at initial conditions, and liquid seawater after 60 hours at 1.6 V applied bias. According to FIG. 4, deionized (DI) liquid water and liquid seawater feedstocks showed very similar initial J-V performance, with an applied bias of 1.6 V producing similar current densities of ~60 mA cm-2. After a 60-hour potentiostatic measurement under operating conditions at 1.6 V, the DI liquid water feedstock case changed little while the electrolyzer fed with liquid seawater showed a drastic drop in current density. After this 60 hour period, the proton exchange membrane electrolyzer run on liquid seawater yielded almost negligible electrolysis current at <2 V.

It will be appreciated that using liquid water feedstock for the electrolysis provides some advantage, given the high current density achievable before the onset of mass transport limitations. This is illustrated by the fact that, within the experimental voltage range, the proton exchange membrane electrolyzer did not reach a limiting current density with liquid water. The formation of gas bubbles at the active sites and subsequent mass transport issues will eventually limit the current, but the limiting current density with liquid water is much greater than that achievable under a 1-Sun solar flux. FIG. 4 also shows that the initial electrolysis performance using liquid seawater was nearly identical to that achieved with purified deionized water. Still, there are limitations on using fresh water sources as mentioned above, as well as the problems with fouling associated with the impurities found in seawater leading to electrochemical reduction of impurity metals onto the cathode, as reflected by the steady decay in current density for seawater over the 60 hours of potentiostatic measurement. Thus, both seawater vapor at near-ocean surface conditions and ambient humidity over land can overcome problems associated with obtaining hydrogen gas from water in liquid forms.

Figure 5:
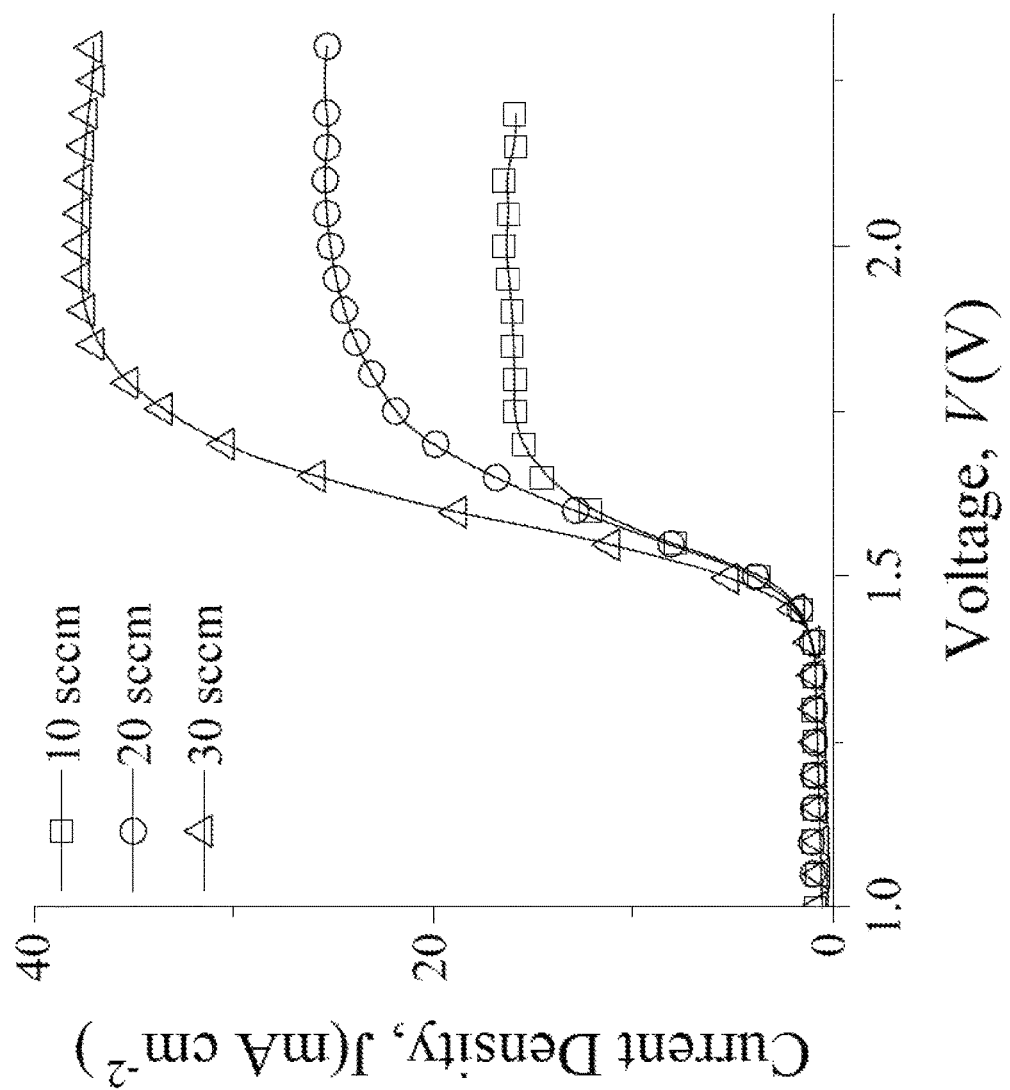
FIG. 5 plots current density, J, vs. applied voltage, V, with varying carrier gas flow rate using a fully humidified proton exchange membrane electrolyzer.

Example 2/FIG. 5

Flow Rate Effect and Seawater Vapor

FIG. 5 plots current density, J, vs. applied voltage, V, with varying carrier gas flow rate using a fully humidified proton exchange membrane electrolyzer (with relative humidity at about 100%). FIG. 5 shows the measured J-V behavior of the proton exchange membrane electrolyzer with a flow of $N_2$(g) carrier gas and fully saturated with seawater vapor as the feedstock. The mass-transport-limited electrolysis current density increased with increasing $N_2$(g)/$H_2$O(g) flow rate, from about 15 mA/cm$^2$ at 10 sccm to about 38 mA/cm$^2$ at a flow rate of 30 sccm to each electrode. Under these conditions with a flow rate of 20 sccm to each electrode, the faradaic efficiency for $H_2$ production at the cathode was measured to be about 93% by GC (Table 1), with a $H_2$:$O_2$ ratio of 2:1.15 for the cathode/anode output streams, respectively.

The electrolysis limiting current density is proportional to the flow rate of humidified carrier gas. As FIG. 5 shows, increasing the flow of $N_2$ from 10 to 30 sccm increased the limiting current density by about 150%. The increase by modifying the rate at which gas flows can offset the reduced concentration of $H_2$O molecules in vapor compared to liquid water as a feedstock. Accordingly, 30 sccm limiting current density of about 38 mA/cm$^2$ demonstrates that solar cells could be operated with water vapor electrolysis without suffering from mass transport limitations. Even so, operating costs and compressor energy losses make it preferable to operate at a lower gas flow rate that enables the proton exchange membrane electrolyzer load curve to intersect the photovoltaic performance curve at the point of maximum efficiency. A lower cathode gas flow rate for the same electrolysis current will also lead to higher concentrations of $H_2$ in the output stream, which should allow for more efficient downstream separation of the product fuel. Accordingly, the high faradaic efficiency measured at the cathode output under these conditions (Table 1) shows that the water vapor electrolysis to $H_2$ is the dominant reaction. Losses that are probably attributable to membrane $H_2$ crossover to the anode and minor leaks from the cell likely can be enhanced with design choices such as but not limited to thicker or more gas-impermeable membranes.

Figure 6:
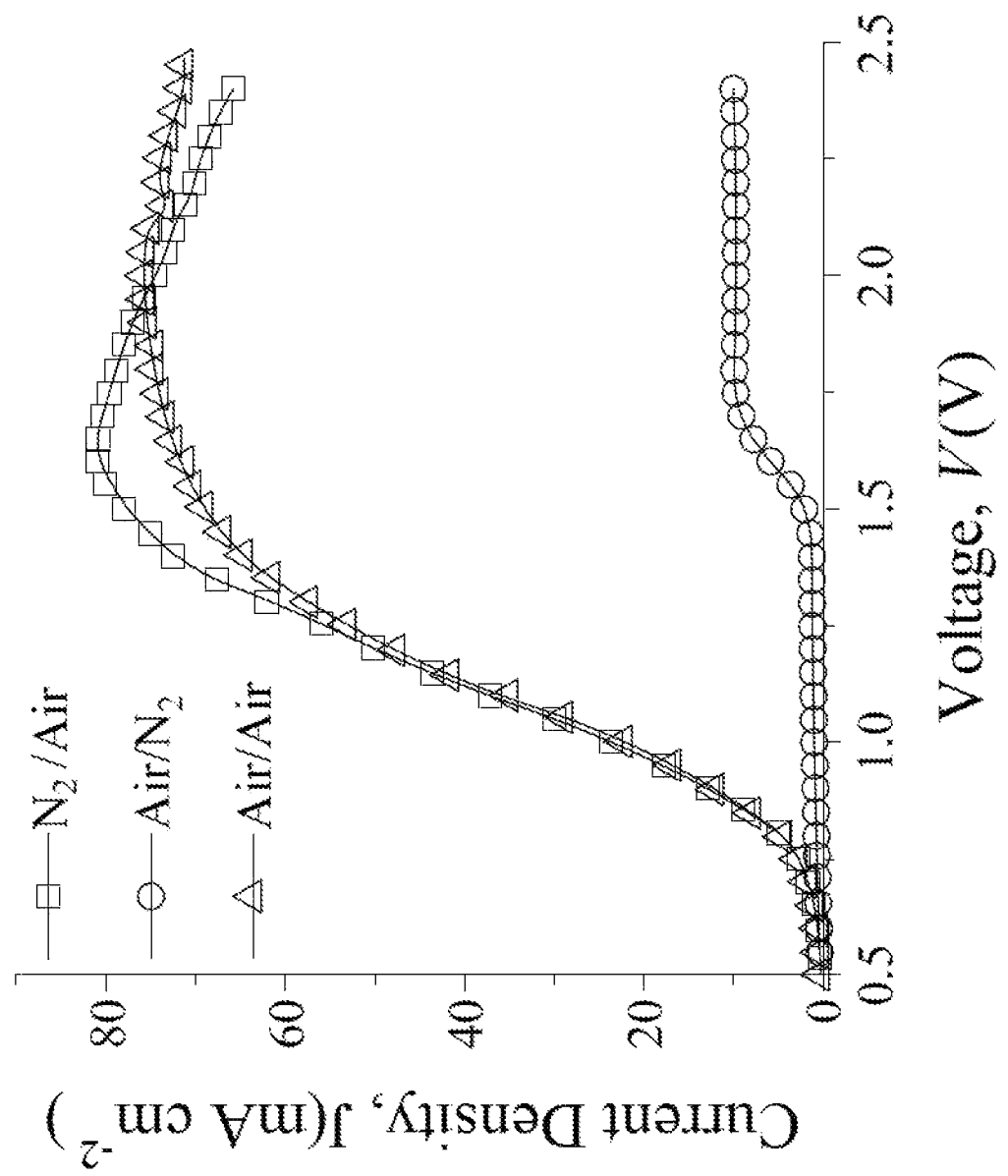
FIG. 6 plots current density, J, vs. applied voltage, V, when using either air or N2 carrier gas to introduce seawater vapor into the proton exchange membrane electrolyzer.

Example 3/FIG. 6

Carrier Gas Effect

FIG. 6 plots current density, J, vs. applied voltage, V, when using either air or $N_2$ as a carrier gas for hydrogen production from seawater vapor introduced to the proton exchange membrane electrolyzer. The gas flow rate was 10 sccm to each electrode with fully humidified (~RH100) air or $N_2$. In each case, the current density remained negligible at <0.75 V. With air and $N_2$(g) carrier gas to the anode and cathode, respectively (which FIG. 6 denotes as "Air/$N_2$") the current density remained low until V>1.5 V, at which point J increased and plateaued at about 11 mA/cm$^2$ at >1.7 V. However, with air fed to both the anode and cathode, the onset potential for significant current decreased to about 0.7 V, with the current rising rapidly and reaching a limiting current density of about 70 mA cm$^2$ at >1.5 V. The observed proton exchange membrane electrolyzer behavior for $N_2$ gas at the anode and air at the cathode was similar to the case for air at both electrodes. As noted previously, with fully humidified air supplied to the cathode, the measured faradaic efficiency for $H_2$ production at the cathode was about 0% (below the GC resolution, Table 1).

With further reference to FIG. 6, when air is admitted only to the anode side with inert gas supplied to the cathode, the electrolyzer behavior exhibited similar, though somewhat lower, current density to that observed with inert carrier gas only. The introduction of oxygen in the carrier gas to the anode does not significantly change the ongoing chemistry because water oxidation at the anode already creates $O_2$. When air is fed to the cathode, however, the presence of a significant concentration of $O_2$ changes the preferred reaction from hydrogen evolution to oxygen reduction. Rather than reducing protons to $H_2$, the protons combine with the $O_2$ to form water in the same way that a fuel cell cathode does. Because this reaction is thermodynamically easier to run than hydrogen evolution, the onset potential (~0.7 V) for current generation drops well below the thermodynamic potential for electrolysis (1.23 V). The kinetic favorability of oxygen reduction relative to hydrogen evolution effectively swamps out all $H_2$ production in the presence of air at the cathode, leading to a faradaic efficiency for $H_2$ fuel of ~0% (Table 1). Accordingly, it is desirable for an efficient solar fuel generation system operating on ambient humidity to protect the hydrogen evolution reaction catalyst from environmental $O_2$, for example by maintaining a stable seal on the cathode compartment in a recirculating inert gas.

Figure 7:
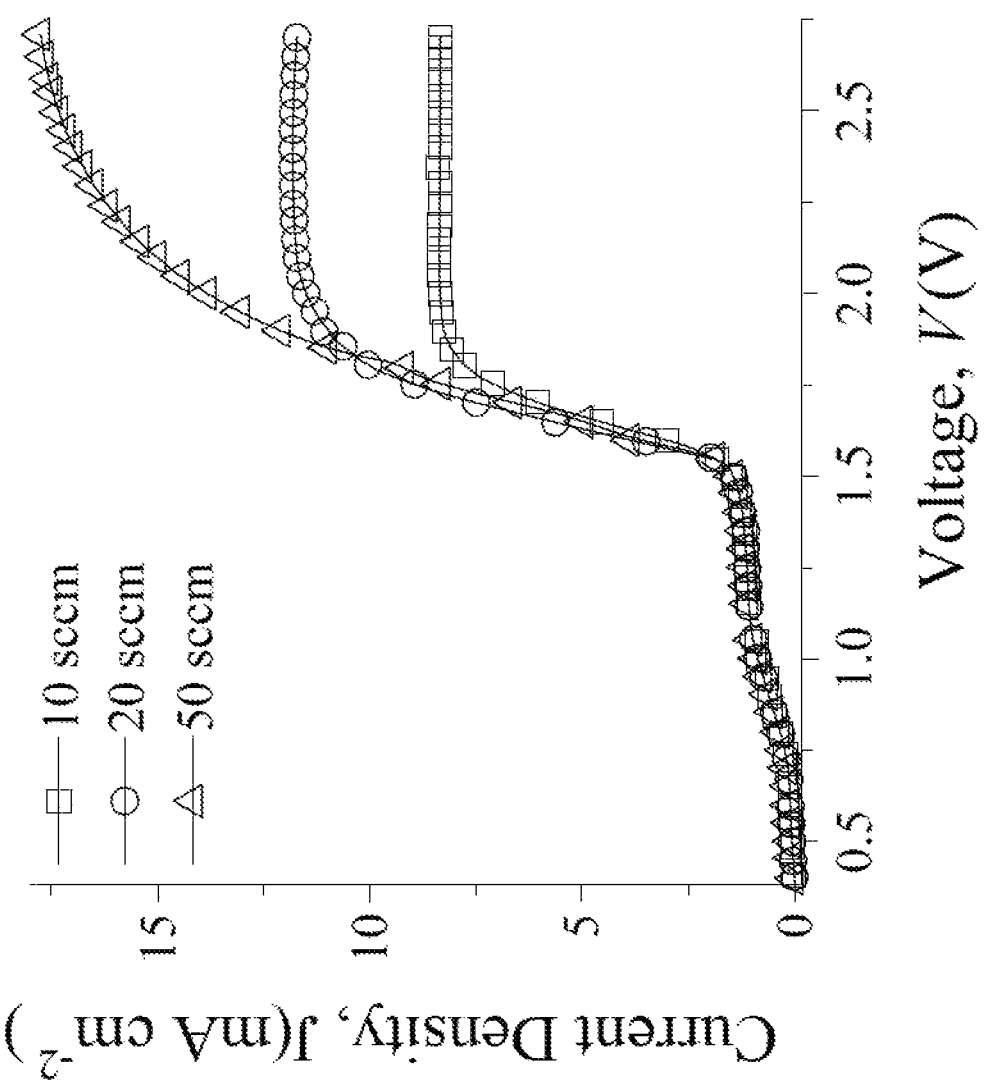
FIG. 7 plots current density, J, vs. applied voltage, V, when varying the gas flow rate of seawater-humidified air (relative humidity 80%) at the anode.

Example 4/FIG. 7

Comparing Flow Rates

FIG. 7 plots current density, J, vs. applied voltage, V, when varying the gas flow rate of seawater-humidified air (relative humidity 80%) at the anode. The cathode was fed dry $N_2$ at 10 sccm in each case. The low cathode flow rate was chosen to minimize compressor losses and maximize $H_2$ output concentration. Use of an inert gas prevents oxygen reduction as a significant side reaction. To test the electrolysis performance at conditions which are feasible using ambient vapor at the near-surface ocean, seawater-humidified air at a relative humidity of 80% was fed to the anode with dry $N_2$ fed to the cathode. FIG. 7 shows the resulting proton exchange membrane electrolyzer performance with varying air flow rate to the anode while maintaining the $N_2$ cathode flow rate at 10 sccm. Under such marine-like conditions with varying anode gas flow rate, the limiting current density was 11-12 mA/cm$^2$, which is sufficient for most photovoltaic cells providing the 1.5 V or higher required for electrolysis. For a low flow rate of 10 sccm to the anode, the limiting current density was about 8 mA/cm$^2$ while current densities >18 mA/cm$^2$ were achieved at a flow rate of 50 sccm or higher.

Figure 8:
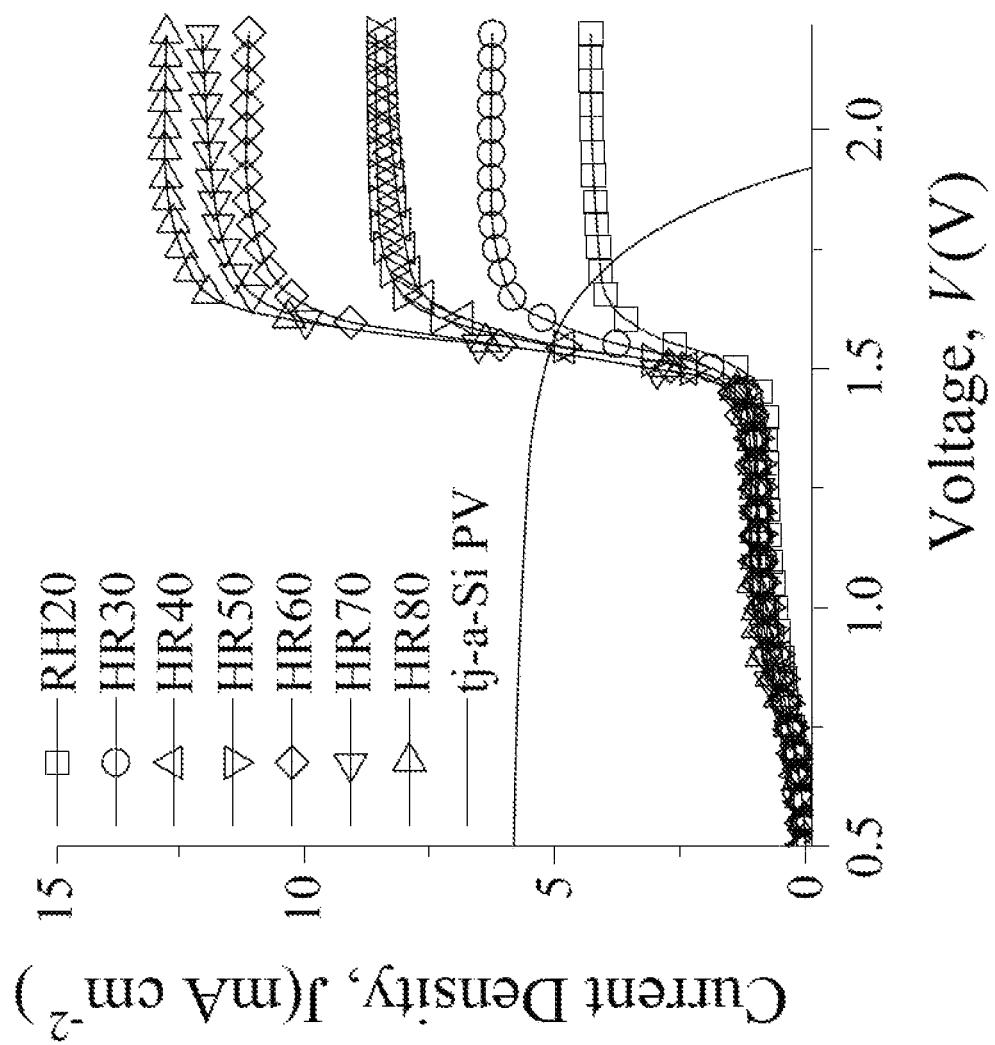
FIG. 8 plots current density, J, vs. applied voltage, V, for the triple-junction photovoltaic cell under illumination as compared to a proton exchange membrane electrolyzer when varying the relative humidity of air at a gas flow rate of 20 sccm (standard cubic centimeters per min) to the anode with dry N2 at 10 sccm to the cathode.

Example 5/FIG. 8

Changes in Relative Humidity

FIG. 8 plots current density, J, vs. applied voltage, V, for the triple-junction cell under illumination as compared to a proton exchange membrane electrolyzer when varying the relative humidity of air at 20 sccm to the anode with dry $N_2$ at 10 sccm to the cathode. Although the near-surface relative humidity over the ocean is fairly consistent at 75-85%, the actual concentration of water vapor in the air, or specific humidity, varies with temperature. Thus, the capacity of these systems to adjust to fluctuations in atmospheric water content as a function of the proton exchange membrane electrolyzer performance is a consideration. Changes in the relative humidity of seawater vapor to the anode input air feedstock significantly affected the J-V behavior of the proton exchange membrane electrolyzer. When the relative humidity at the anode was decreased, a corresponding decrease in the limiting current density was observed as shown in FIG. 8. With a seawater-humidified air at a flow rate of 20 sccm to the anode and dry $N_2$ at 10 sccm to the cathode, current densities >12 mA/cm$^2$ were achieved at a relative humidity of 80% and decreased to <4 mA/cm$^2$ at a relative humidity of 20%. The 1-Sun illuminated J-V performance of the triple junction cell is included in FIG. 8 and demonstrates the effect on the solar-driven electrolysis operating point. The photovoltaic was measured to have an open-circuit voltage, $V_{oc}$, of 1.92 V, a short-circuit current density, Jsc, of 5.88 mA/cm$^2$, a fill factor of 0.70, and a power-conversion efficiency, η, of 7.9%. As FIG. 8 shows, decreasing the relative humidity at 70° F. produced a concomitant drop in the limiting current density of the proton exchange membrane electrolyzer.

FIG. 8 further shows that decreasing relative humidity leads to a reduced water vapor flux to the active sites, reducing the limiting current density. However, the decrease is particularly pronounced at relative humidity levels below 60%, which may be due to partial dehydration of the membrane, as certain materials used in constructing membranes, including Nafion, must be kept well-hydrated to maintain a high ionic conductivity, with water preferentially filling hydrophilic, negatively charged channels which allow the selective transfer of protons. On the other hand, without sufficient water, the channels constrict and the membrane conductivity is significantly reduced. But for a solar-driven system at low current density, Nafion demonstrates adequate ionic conductivity, and it is to be expected that a thicker membrane is also suitable and would occasion modest losses, if any, due to additional ohmic resistance.

Accordingly, the effect of reduced humidity on proton exchange membrane electrolyzer performance is primarily manifested in the limiting current density, which is not reached until about 1.7 V. When the electrolysis is driven by a photovoltaic such as the triple-junction cell, however, the operating voltage will be at the intersection of the PV and electrolyzer J-V curves, which is estimated to occur at about 1.6 V for most of these electrolysis conditions. Therefore, at 1.6 V, the electrolyzer limiting current density is greater than the PV photocurrent density for RH≥30%. Thus, the predicted ηSTH of ~6% using a triple junction cell to drive electrolysis of gaseous water is expected to be resistant to drops in the ambient humidity at levels of at least RH 30% and higher (Table 3). Because a significant percentage of the land mass of the world regularly experiences relative humidity of at least 30%, it suggests that the present embodiments could be put to great use over land in addition to marine environments. At the same time, for more efficient photovoltaics reaching higher photocurrent densities, the solar-to-fuel efficiency would likely be more sensitive to humidity, requiring a greater $H_2O(g)$ concentration to keep up with the photovoltaic current density. As an example of adjustments that might become pertinent in operation and that are well within the capabilities of skilled artisans, this loss could be offset by increasing the seawater-humidified anode air flow rate when the ambient specific humidity decreases enough to affect solar-to-hydrogen performance.

TABLE 3

Projected operating conditions for varying anode air RH when driven by the triple-junction cell as in FIG. 8. Calculated solar-to-hydrogen efficiency assumes 100% faradaic efficiency for $H_2$ production.

| Relative Humidity (%) | Voltage (V) | Current Density (mA cm$^{-2}$) | Projected $\eta_{STH}$ (%) |
|---|---|---|---|
| 80 | 1.53 | 5.04 | 6.20 |
| 70 | 1.53 | 5.09 | 6.26 |
| 60 | 1.53 | 5.06 | 6.22 |
| 50 | 1.55 | 4.99 | 6.14 |
| 40 | 1.55 | 4.97 | 6.11 |
| 30 | 1.58 | 4.83 | 5.94 |
| 20 | 1.70 | 4.03 | 4.96 |

Figure 9:
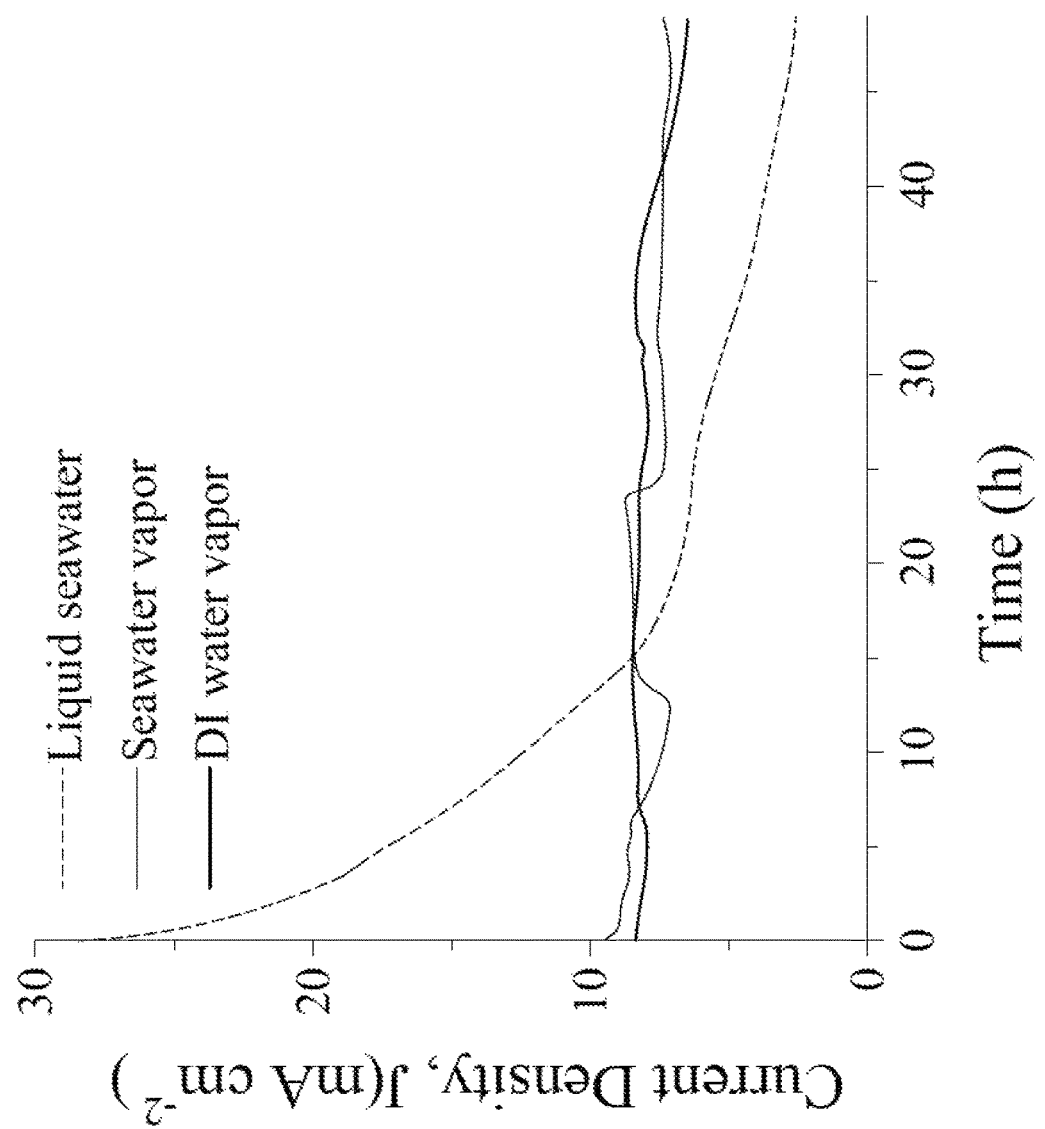
FIG. 9 plots current density, J, vs. time, at an applied voltage of 1.6 V for liquid seawater and water vapor from seawater or deionized water.

Example 6/FIG. 9

Performance Over Time—Liquid Seawater and Deionized Water

FIG. 9 plots current density, J, vs. time, at an applied voltage of 1.6 V. The proton exchange membrane electrolyzer feedstock was either liquid seawater, seawater-humidified at a relative humidity of 80% air at 20 sccm to the anode, or deionized water-humidified air at a relative humidity of 80% at 20 sccm to the anode. Dry $N_2$ at 10 sccm was input to the cathode for both water-vapor-fed conditions. FIG. 9 shows the change in the electrolysis current density with time for an input of liquid seawater, or 10 sccm dry $N_2$ to the cathode/20 sccm at a relative humidity of 80% to the anode using either seawater vapor or deionized water vapor. The proton exchange membrane electrolyzer was operated potentiostatically at 1.6 V during the measurement, near the expected operating point when driven by the triple junction cell. The current density for electrolysis in liquid seawater started high but continually decayed at greater than 50 hours to less than 2 mA/cm$^2$. By comparison, for water-vapor-fed electrolysis, the current density quickly reached a stable value whether the humidity came from seawater or deionized water. Stability was demonstrated for >50 consecutive hours at realistic marine conditions of 80% relative humidity. For the seawater vapor electrolysis, the current density remained stable over the course of the experiment at about 7-8 mA/cm$^2$, consistent with the performance at 1.6 V expected from FIG. 7.

The steep decrease shown in FIG. 9 for the current density with liquid seawater over 50 hours at 1.6 V is largely due to the dissolved impurities in the seawater fouling the catalyst and significantly increasing the reaction overpotential. With seawater-humidified air as the feedstock, the current density for the electrolysis remained steady for more than 50 hours, as the gas stream lacks significant impurities to foul the catalyst. The magnitude and stability of the electrolysis current was comparable whether the air was humidified DI or seawater, exhibiting only minor fluctuations in current density that were attributed to variations in the relative humidity over the course of the measurement. Despite bubbling the air through actual ocean water, the salts and impurities are effectively left behind in the liquid phase, similar to ocean evaporation leading to freshwater precipitation. After about 17 h of operation, the seawater-humidified RH80 air fed electrolyzer actually outperformed the liquid seawater fed electrolyzer.

Figure 10:
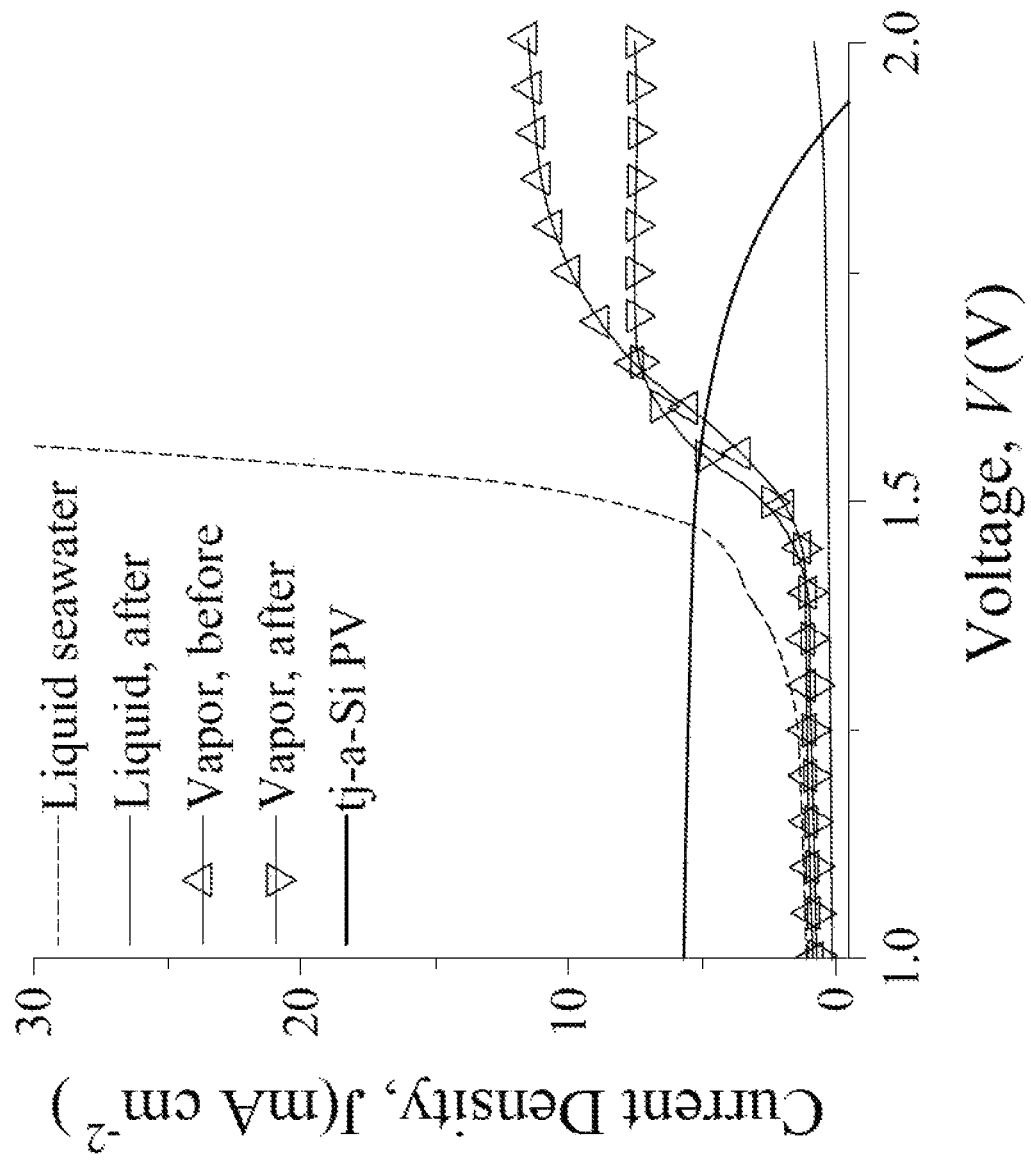
FIG. 10 plots current density, J, vs. applied voltage, V under illumination with comparison to a proton exchange membrane electrolyzer with a feedstock of liquid seawater before and after 50 hours at 1.6 V, and with seawater-humidified air at a relative humidity of 80%.

Example 7/FIG. 10

Performance Over Time—Liquid Seawater and Seawater Vapor

FIG. 10 plots current density, J, vs. applied voltage, V, for the triple junction cell under illumination as compared to a proton exchange membrane electrolyzer with a feedstock of liquid seawater before and after 50 hours at 1.6 V, and with seawater-humidified air at a relative humidity of 80% at 20 sccm to the anode and dry $N_2$ at 10 sccm to the cathode before and after 50 hours at 1.6 V. The current density curves taken before the 50 hour operation represent initial performance after equilibration at the operating conditions but before extend operation under applied bias. The comparison of J-V behavior of the proton exchange membrane electrolyzer with liquid seawater feedstock against seawater-humidified air feedstock before and after 50 hours demonstrates the extended potentiostatic operation. When initially immersed in liquid seawater, the proton exchange membrane electrolyzer did not reach a limiting current density within the experimentally measured voltage range, with a current density of 56.5 mA/cm$^2$ at 1.6 V from the first J-V curve. However, the potentiostatic measurement after 50 hours associated with liquid seawater feedstock demonstrated a decrease in current density to 0.2 mA/cm$^2$ in the final J-V curve, which is 0.4% of the initial value at 1.6 V.

The J-V behavior of the proton exchange membrane electrolyzers as shown in FIG. 10, which is before and after 50 hours of operation, further highlights the benefits of the vapor-fed design for solar fuels generation. The operating current density and resulting efficiency with an area-matched, triple-junction cell driving the reaction drops to negligible fuel production after 50 hours in liquid seawater, but remains essentially unchanged at ambient near-surface ocean humidity conditions. Assuming 100% faradaic efficiency for $H_2$, the calculated ηSTH in liquid seawater decayed from an initial value of 6.5% to only 0.5% over 50 hours, while the ηSTH with seawater-humidified air at a relative humidity of 80% changed from 6.0% to 6.3% over the same period. This result demonstrates the viability of the water vapor electrolysis approach to stably and efficiently generate $H_2$ from seawater.

In contrast, with seawater vapor feedstock, FIG. 10 shows that the limiting current density reached about 11 mA/cm$^2$, and dropped modestly to about 8 mA/cm$^2$ immediately after the 50 hour potentiostatic measurement. However, at 1.6 V the seawater-vapor-fed current density was essentially unchanged, remaining 6-7 mA/cm$^2$ before and after the extended 50 hour measurement. FIG. 10 includes the 1-Sun illuminated J-V performance of the triple-junction cell, in view of the solar-driven electrolysis operating point.

Figure 11:
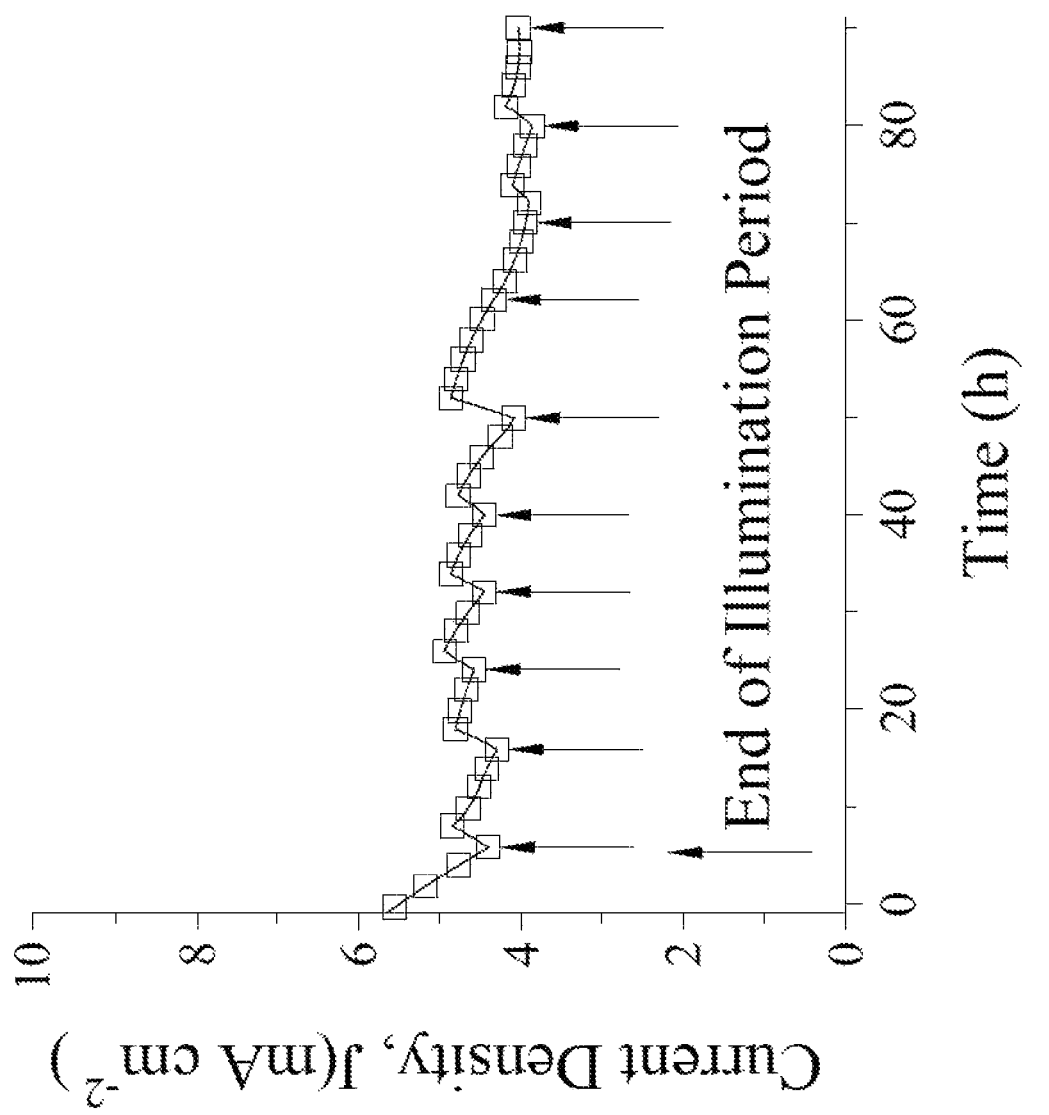
FIG. 11 plots current density, J, vs. time for electrolysis directly driven by 1 Sun illumination.

Example 8/FIG. 11

Electrolysis Under 1 Sun Illumination

FIG. 11 plots current density, J, vs. time for electrolysis directly driven by the triple junction photovoltaic cell under 1 Sun illumination. The electrolyzer feedstock was seawater-humidified air at a relative humidity of 80% at 20 sccm to the anode and dry $N_2$ at 10 sccm to the cathode. The illumination was provided to the system in 8 hour intervals each day. To simulate expected conditions for a solar fuels generation device performing electrolysis upon ambient humidity found at near-surface ocean conditions, the proton exchange membrane electrolyzer was operated directly from the tj-a-Si cell under AM1.5, 1-Sun illumination using seawater-humidified RH80 air at the anode. The diurnal day-night cycle was approximated by illuminating the photovoltaic and proton exchange membrane electrolyzer for 8 continuous hours per day, with the cumulative data under illumination shown in FIG. 11.

During the entire process, the electrolyzer feedstock was maintained using seawater-humidified air (RH 80%) at 20 sccm and dry $N_2$ (g) at 10 sccm to the anode and cathode, respectively. The resulting current density of the proton exchange membrane electrolyzer was generally stable with an average value greater than 4.5 mA/cm$^2$ over the cumulative illuminated period of 90 hours. Although the current density was observed to marginally decrease over a given day, the performance was recovered at the start of the next illumination cycle. The arrows in FIG. 11 mark the break between the end of one 8 hour light cycle and start of the next on the following day. Although some decrease in current density was observed during an 8 hour period, the current density generally increased the following day. The equation for solar-to-hydrogen conversion efficiency, ηSTH, is:

$$\eta_{STH} = \frac{J(1.23\text{ V})}{P_{in}} \quad (1)$$

where J is the externally measured current density (assuming 100% faradaic efficiency to $H_2$), the thermodynamic potential for electrolysis at 70° F. is 1.23 V, and $P_{in}$ is the incident illumination power density. Using Equation. 1, the average solar-to-hydrogen conversion efficiency was about 6.0% on day 1 to about 5.5% on day 11 of the measurement, a change of about 8%. Accordingly, FIG. 11 shows that the harnessing of solar energy through photovoltaic cells provides sufficient energy for hydrogen production through electrolysis of humidified air.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "such as," "comprising," "e.g.," "containing," or "having" and variations of those words is meant to encompass the items listed thereafter, and equivalents of those, as well as additional items. The use of "including" (or, "include," etc.) should be interpreted as "including but not limited to."

Accordingly, the foregoing descriptions of several embodiments and alternatives are meant to illustrate, rather than to serve as limits on the scope of what has been disclosed herein. It will be understood by those having ordinary skill in the art that modifications and variations of these embodiments are reasonably possible in light of the above teachings and descriptions.

What is claimed is:

1. A photovoltaic-driven hydrogen production system, comprising:
    a casing supporting a photovoltaic cell configured to receive solar energy that is converted to electric potential energy (voltage) sufficient to convert humidified air into oxygen gas and hydrogen ions through electrolysis;
    an electrolyzer for converting humidified air to hydrogen gas, the electrolyzer comprising,
    an anode compartment that receives humidified air, the anode compartment having an anode that converts the humidified air to oxygen gas and hydrogen ions through electrolysis;
    a cathode compartment that receives the protons and having a cathode that converts the protons to hydrogen gas; and
    a membrane separating the anode compartment from the cathode compartment that allows protons to pass from the anode compartment to the cathode compartment.

2. The system of claim 1, further comprising an oxygen evolution reaction catalyst positioned in the anode compartment that catalyzes the electrolysis reaction.

3. The system of claim 1, further comprising a hydrogen evolution reaction catalyst positioned in the cathode compartment that catalyzes the conversion of protons to hydrogen gas.

4. The system of claim 1, further comprising an inlet membrane arranged with an inlet to the anode compartment, wherein the inlet membrane is permeable to humidified air to allow the humidified air to enter the anode compartment.

5. The system of claim 1, wherein the anode compartment and the cathode compartment are arranged along serpentine flow channels in direct electrical communication with the photovoltaic cell.

6. The system of claim 1, further comprising an outlet through which the hydrogen gas produced through electrolysis exits the cathode compartment.

7. The system of claim 6, further comprising a vessel for storing the hydrogen gas.

8. A photovoltaic-driven hydrogen production system for use at or near an ocean surface to obtain hydrogen gas from seawater vapor, comprising:
    a buoyant casing supporting a photovoltaic cell configured to receive solar energy that is converted to electric potential energy (voltage) sufficient to convert seawater vapor into oxygen gas and hydrogen through electrolysis;
    an electrolyzer for converting seawater vapor to hydrogen gas, the electrolyzer comprising,
    an anode compartment that receives near ocean-surface seawater vapor, the anode compartment having an anode that converts the seawater vapor to oxygen gas and hydrogen ions through electrolysis;
    a cathode compartment that receives the protons and having a cathode that converts the protons to hydrogen gas; and
    a membrane separating the anode compartment from the cathode compartment that allows protons to pass from the anode compartment to the cathode compartment.

9. The system of claim 8, further comprising an oxygen evolution reaction catalyst positioned in the anode compartment that catalyzes the electrolysis reaction.

10. The system of claim 8, further comprising a hydrogen evolution reaction catalyst positioned in the cathode compartment that catalyzes the conversion of protons to hydrogen gas.

11. The system of claim 8, further comprising ballast in the casing for maintaining the orientation of the photovoltaic cell above the ocean surface.

12. The system of claim 8, further comprising an inlet membrane arranged with an inlet to the anode compartment, wherein the inlet membrane is permeable to seawater vapor and substantially impermeable to liquid seawater in order to substantially restrict the access of liquid seawater to the anode compartment.

13. The system of claim 8, wherein the anode compartment and the cathode compartment are arranged along serpentine flow channels in direct electrical communication with the photovoltaic cell.

14. The system of claim 8, further comprising an outlet through which the hydrogen gas produced through electrolysis exits the cathode compartment.

15. The system of claim 14, further comprising a vessel for storing the hydrogen gas.

* * * * *